United States Patent [19]

Hattori et al.

[11] 4,138,982

[45] Feb. 13, 1979

[54] ELECTRONIC IGNITION TIMING ADJUSTING SYSTEM FOR INTERNAL COMBUSTION ENGINE

[75] Inventors: Tadashi Hattori; Minoru Nishida; Yoshiki Ueno, all of Okazaki, Japan

[73] Assignee: Nippon Soken, Inc., Nishio, Japan

[21] Appl. No.: 696,364

[22] Filed: Jun. 15, 1976

[30] Foreign Application Priority Data

Jul. 10, 1975 [JP] Japan .................................. 50-84963
Jul. 10, 1975 [JP] Japan .................................. 50-84964

[51] Int. Cl.² .............................................. F02P 1/00
[52] U.S. Cl. ................................................ 123/148 E
[58] Field of Search ................................... 123/148 E

[56] References Cited

U.S. PATENT DOCUMENTS

| | | | |
|---|---|---|---|
| 3,972,310 | 8/1976 | Gambill | 123/148 E |
| 3,989,024 | 11/1976 | Lai | 123/148 E |
| 4,008,698 | 2/1977 | Gartner | 123/148 E |
| 4,041,912 | 8/1977 | Sessions | 123/148 E |

Primary Examiner—Samuel W. Engle
Assistant Examiner—Thomas H. Webb
Attorney, Agent, or Firm—Cushman, Darby & Cushman

[57] ABSTRACT

In an electronic ignition timing adjusting system for an internal combustion engine wherein in response to two particular angular positions of the crankshaft of an internal combustion engine a capacitor is charged and discharged so that the time of termination of the discharging of the capacitor is selected as the desired ignition timing of the engine, when the amount of charge on the capacitor is greater than a predetermined value, the charge and discharge currents of the capacitor are reduced as compared with those under other conditions. The capacitor is prevented from being saturated at low engine speeds, thereby accomplishing stable adjustment of the ignition timing throughout the range of low and high rotational speeds of the engine with a high degree of accuracy.

9 Claims, 9 Drawing Figures

FIG.7

ELECTRONIC IGNITION TIMING ADJUSTING SYSTEM FOR INTERNAL COMBUSTION ENGINE

FIELD OF THE INVENTION

The present invention relates to an electronic ignition timing adjusting system for an internal combustion engine which electronically determines the optimum ignition timing.

DESCRIPTION OF THE PRIOR ART

Figure 1A:
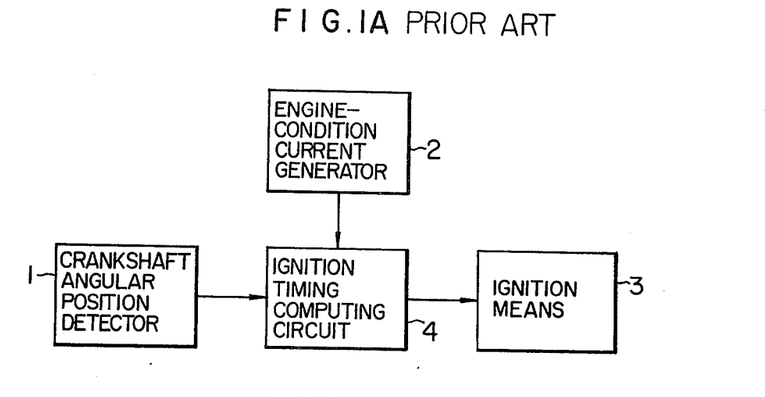
FIGS. 1A and 1B are respectively a block diagram of a prior art system and a time chart diagram of this system.
Figure 1B:
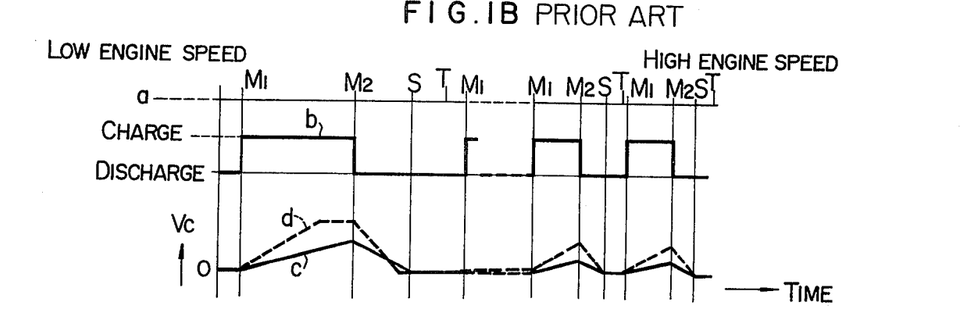
Figure 2:
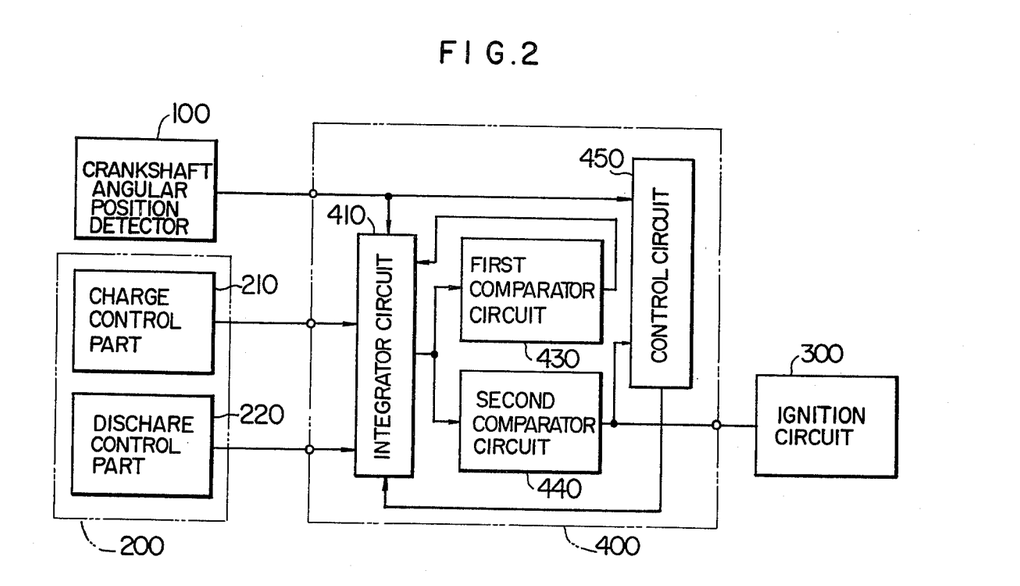
FIG. 2 is a block diagram showing a first embodiment of an electronic ignition timing adjusting system of this invention.

FIGS. 1A and 1B illustrate respectively a block diagram of the prior art system disclosed in the Japanese Patent Application Laid-Open No. 92430/74 and a time chart showing the operating principle of this prior art system. In FIG. 1A, numeral 1 designates crankshaft angular position detector means for detecting particular angular positions of the crankshaft of an internal combustion engine, 2 an engine-condition current generator connected to sensors (not shown) for detecting the operating conditions of the engine and responsive to the electrical signals from these sensors to provide a current corresponding to the operating conditions of the engine, 4 an ignition timing computing circuit for determining the timing of ignition, 3 ignition means for effecting the ignition at the ignition point or timing determined by the ignition timing computing circuit 4. In FIG. 2, on a time base a, $M_1$ and $M_2$ designate two different rotational angular positions of the crankshaft, T the top dead center, S an ignition position.

The operation of this prior art system will now be described. The crankshaft angular position detector means 1 detects two rotational angular positions $M_1$ and $M_2$ of the crankshaft. In the ignition timing computing circuit 4 is provided a capacitor which is not shown. The capacitor starts charging with a constant current at the position $M_1$ and it stops charging at the position $M_2$ simultaneously starting to discharge with a constant current. The discharge is terminated at the point S which in turn is used as the desired ignition timing. In this case, the terminal voltage of the capacitor changes as shown by a solid line charging the discharging curve C in FIG. 1B. In other words, where the charge and discharge currents of the capacitor are constant, the ignition timing is constant in relation to the angular position of the crankshaft independently of the rotational speed of the engine and thus the discharge current or the charging current of the capacitor may be changed in accordance with the operating conditions of the engine to change the ignition timing to suit the operating conditions of the engine. A broken line curve b shown in FIG. 1B shows the charging and discharging conditions of the capacitor.

With the prior art system described above, however, where the rotational speed of an internal combustion engine changes rapidly, it is impossible to obtain satisfactory results. For instance, in the case of a four-cylinder, four-cycle internal combustion engine, the rotational speed of the engine varies at a ratio of as high as about 1 : 30 from a low of about 200 rpm when the engine is being cranked for starting to a high of about 6000 rpm, the charging time of the capacitor (the time period between the angular positions $M_1$ and $M_2$) varies at a ratio of about 30 : 1 and the terminal voltage $V_c$ of the capacitor (the curve c shown in FIG. 1B) also varies at a ratio of about 30 : 1. Thus, a disadvantage of the conventional system is that if the charging current is reduced to obtain the desired results at low engine speeds, the terminal voltage $V_c$ of the capacitor is reduced at high engine speeds and consequently if the ignition timing is determined by detecting the time of termination of the discharge of the capacitor, accuracy of the resulting ignition timing is considerably deteriorated as compared with that obtained at the low engine speeds. Another disadvantage is that if, on the contrary, the charging current of the capacitor is increased to increase the terminal voltage $V_c$ of the capacitor and thereby to obtain the desired accuracy at the high engine speeds, the terminal voltage of the capacitor is saturated as shown by a broken line d in FIG. 1B making it impossible to obtain the desired ignition timing.

SUMMARY OF THE INVENTION

With a view to overcoming the foregoing difficulty, it is an object of the invention to provide an electronic ignition timing adjusting system for an internal combustion engine wherein when the amount of charge on a capacitor is greater than a predetermined amount, the charge and discharge currents of the capacitor are respectively reduced with a predetermined rate as compared with those used when the amount of charge on the capacitor is less than the predetermined amount, whereby the charging and discharging times of the capacitor are increased at the low engine speeds, while the same charging and discharging times are decreased at the high engine speeds, thus overcoming the foregoing difficulty and thereby ensuring stable adjustment of the ignition timing with a high degree of accuracy throughout the range of low and high speeds of the engine.

It is another object of the invention to provide an electronic ignition timing adjusting system for an internal combustion engine wherein a first and second capacitor are provided, whereby when the voltage on the first capacitor reaches a predetermined value the second capacitor is caused to start charging, after the completion of the charging of the second capacitor it is caused to discharge, after the completion of the discharging of the second capacitor the first capacitor is caused to discharge and the time of the termination of the discharging of the first capacitor is selected as the desired ignition timing, whereas when the voltage on the first capacitor does not reach the predetermined value the second capacitor is not caused to charge and discharge but the first capacitor is caused to discharge and the time of the termination of the discharging of the first capacitor is computed as the desired ignition timing, thereby ensuring stable adjustment of the ignition timing with a high degree of accuracy throughout the range of low and high speeds of the engine.

It is still another object of the invention to provide an electronic ignition timing adjusting system for an internal combustion engine wherein the charge and discharge currents of a second capacitor are made smaller than those of a first capacitor to reduce the slope of the charging and discharging conditions of the second capacitor as compared with that of the charge and discharge currents of the first capacitor and ensure improved stability of the ignition timing at the low engine speeds.

DESCRIPTION OF THE PREFERRED EMBODIMENTS

The present invention will now be described in greater detail with reference to the illustrated embodiments. In the first embodiment shown in FIG. 2, numeral 100 designates crankshaft angular position detector means for detecting the angular positions of the crankshaft of a four-cylinder, four-cycle internal combustion engine, 200 engine condition detector means connected to sensors (not shown) which detect the operating conditions of the engine and constituting a charge and discharge control circuit responsive to the electrical signals from the sensors to supply a signal corresponding to the engine operating conditions and thereby to generate capacitor charging and discharging signals, with the conditions to be detected including the rotational speed, intake manifold vacuum, cooling water temperature, etc., of the engine. The engine condition detector means 200 comprises a charge control part 210 and a discharge control part 220 which may be designed so that the output voltage of the two control parts are varied in accordance with the operating conditions of the engine or alternately the output voltage of one of the two control parts alone is varied and the output voltage of the other control part is maintained at a fixed value. Numeral 400 designates an ignition timing computing circuit for determining the timing of ignition by a capacitor charge and discharge system, 300 a known type of ignition circuit for effecting the ignition in response to the output signal of the ignition timing computing circuit 400. The ignition timing computing circuit 400 comprises an integrator circuit 410, a first comparator circuit 430 and a second comparator circuit 440 constituting a charge detector circuit for detecting the amount of charge stored in the capacitor included in the integrator circuit 410 and a control circuit 450 for controlling the charging and discharging of the capacitor included in the integrator circuit 410. The second comparator circuit 440 and the control circuit 450 constitute an ignition signal generating circuit.

Figure 4:
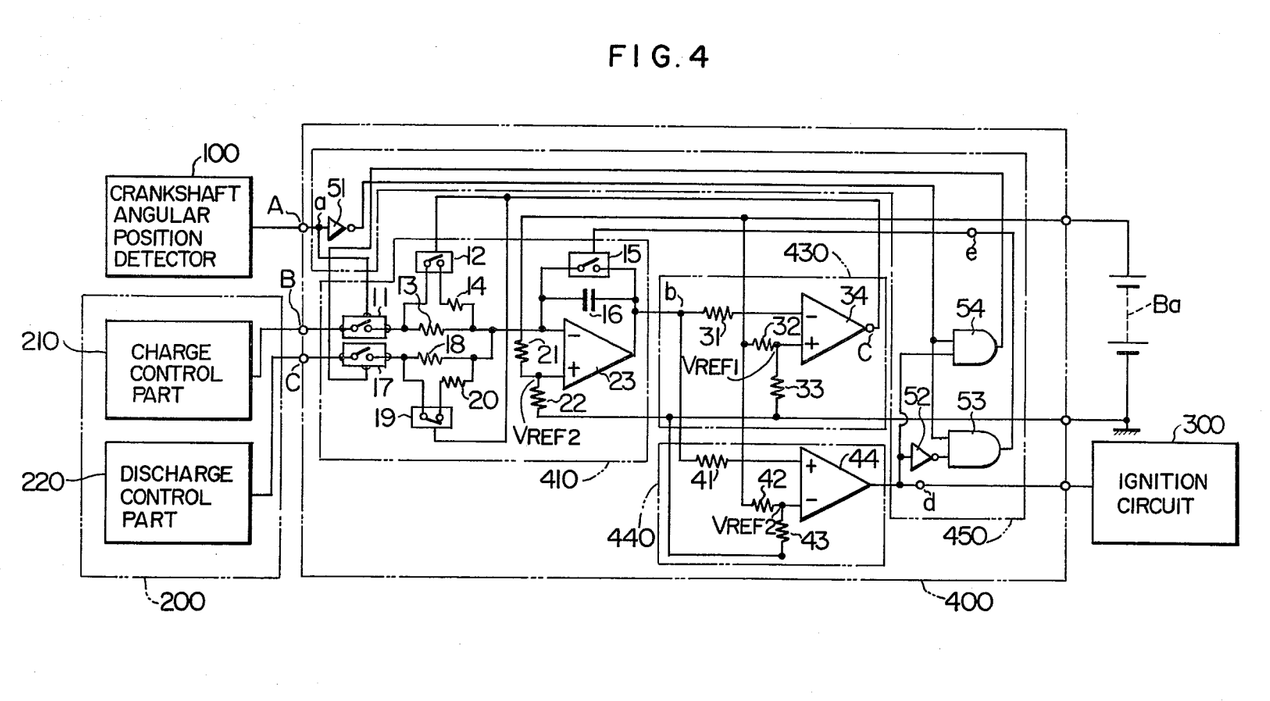
FIG. 4 is a wiring diagram showing detailed circuitry of the system of this invention shown in FIG. 2.

Next, detailed circuitry of the system of this invention constructed as described above will now be described with reference to FIG. 4. The integrator circuit 410 comprises analog switches 11, 12, 17 and 19 each of which is turned on in response to a "1" signal, charge resistors 13 and 14, discharge resistors 18 and 20, bias resistors 21 and 22, a capacitor 16 and a differential amplifier 23, whereby on charge the analog switch 11 is turned on, while on discharge the analog switch 17 is turned on, and when the amount of charge on the capacitor 16 is greater than a predetermined amount the analog switches 12 and 19 are turned off, whereas the analog switch 15 is turned on during resetting periods of the capacitor 16. Each of these analog switches may be advantageously composed of a field effect transistor. Using as a reference a reference voltage $Vref_2$ determined by the bias resistors 21 and 22, the capacitor 16 charges when the output voltage is lower than the reference voltage $Vref_2$, whereas the capacitor 16 discharges when the input voltage is higher than the reference voltage $Vref_2$. Consequently, the output voltage of the charge control part 210 of the engine condition detector means 200 is selected lower than the reference voltage $Vref_2$, while the output voltage of the discharge control part 220 is selected higher than the reference voltage $Vref_2$, and thus the output of the integrator circuit 410 increases in a positive direction when the capacitor is charging, whereas is decreases toward a negative value when the capacitor is discharging. The first comparator circuit 430 comprises an input resistor 31, bias resistors 32 and 33 and a comparator 34 and it detects the amount of the charge on the capacitor 16 in accordance with a preset voltage $Vref_1$ determined by the bias resistors 32 and 33. Thus, the output of the first comparator circuit 430 goes to the "0" level when its input voltage is higher than the reference voltage $Vref_1$, whereas the output goes to the "1" level when its input voltage is lower than the reference voltage $Vref_1$. The second comparator circuit 440 comprises an input resistor 41, bias resistors 42 and 43 and a comparator 44 and its preset voltage determined by the bias resistors 42 and 43 is the same as the reference voltage $Vref_2$ of the integrator circuit 410, whereby its output goes to the "1" level when its input voltage is higher than the reference voltage $Vref_2$, whereas the output goes to the "0" level when its input voltage is lower than the reference voltage $Vref_2$. The control circuit 450 comprises NOT gates 51 and 52 and AND gates 53 and 54. Symbol Ba designates a battery. The analog switches 12 and 19 and the input resistors 14 and 20 constitute a charge and discharge current reducing circuit.

Figure 3:
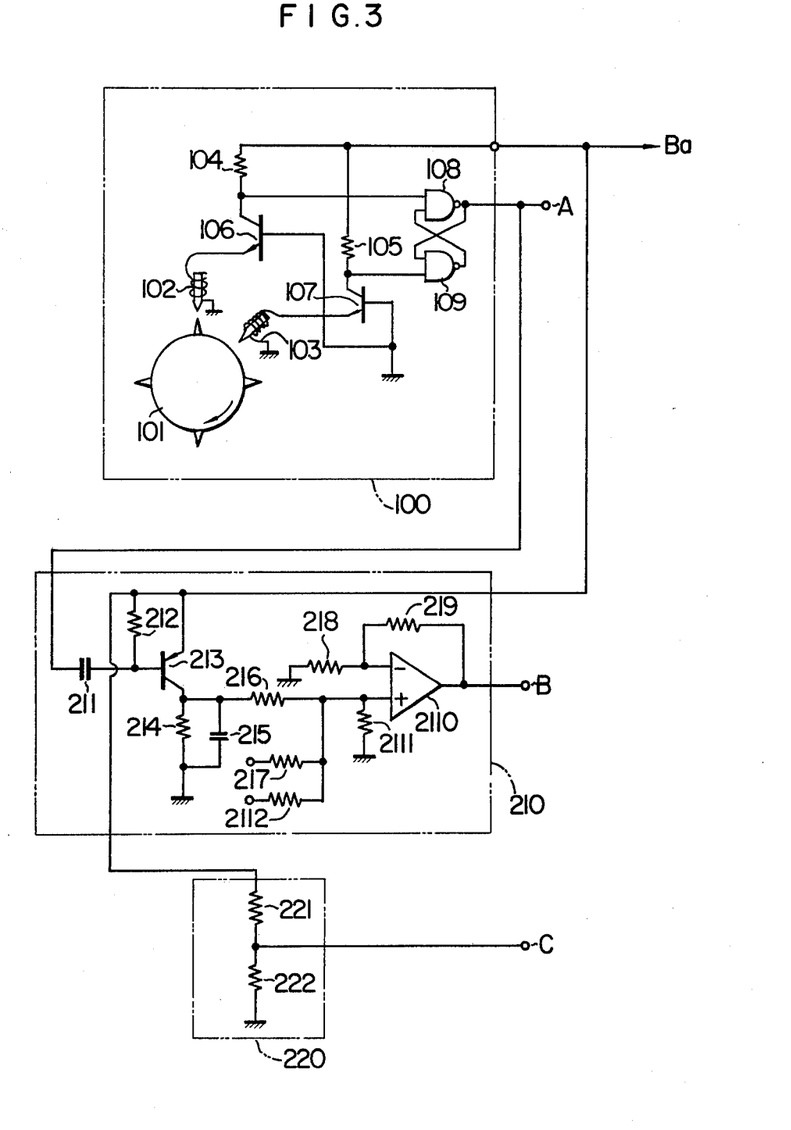
FIG. 3 is a circuit diagram showing an embodiment of detailed circuits of the crankshaft angular position detector means and the engine condition detector means used in the system of this invention.

Next, an embodiment of detailed circuitry of the crankshaft angular position detector means 100 and the engine condition detector means 200 will now be described with reference to FIG. 3. In the crankshaft angular position detector means 100, numeral 101 designates a rotor having four projections arranged on its outer periphery at equal intervals and fixedly mounted on the engine distributor shaft which is not shown for rotation therewith. Numerals 102 and 103 designate a first and second electromagnetic pickup which are arranged so that they are displaced predetermined angles from each other in the circumferential direction of the rotor 101 and opposed to the projections on the rotor 101. Numerals 106 and 107 designate transistors respectively connected to the electromagnetic pickups 102 and 103, 104 and 105 resistors. Numerals 108 and 109 designate NAND gates constituting a flip-flop circuit having its one input connected to the collector of the transistor 106 and its other input connected to the collector of the transistor 107. The rotor 101 makes one complete rotation in the direction of an arrow for every two revolutions of the crankshaft so that when each of the projections on the rotor 101 passes the electromagnetic pickups 102 and 103, respectively, each of the electromagnetic pickups 102 and 103 generates a signal which goes from positive to negative. Consequently, the electromagnetic pickups 102 and 103 respectively detect angular positions $M_1$ and $M_2$ of the crankshaft for each of the cylinders. When the electromagnetic pickups 102 and 103 respectively generate a negative signal, the transistors 106 and 107 are correspondingly turned on so that the flip-flop circuit comprising the NAND gates 108 and 109 operates in response to the turning on of the transistors 106 and 107 and thus the flip-flop circuit generates the output shown in (a) of FIG. 5 which corresponds to the rotational speed of the engine.

Next, the engine condition detector means 200 will be described by assuming, for example, that the charge control part 210 uses the engine speed as a parameter. Capacitors 211 and 215, resistors 212 and 214 and a transistor 213 constitute an engine speed circuit which integrates the output pulses of the crankshaft angular position detector means 100 through differentiation, whereby the differentiated pulses produced by the resistor 212 and the capacitor 211 are integrated by the capacitor 215. The resulting output is such that the collector potential of the transistor 213 increases substantially linearly with increase in the engine speed, since the transistor 213 is turned on for only a determined time width of the differentiated pulse when the output pulse of the crankshaft angular position detector means 100 goes from the "1" to "0" level. This output is then coupled for positive amplification to an adder circuit comprising input resistors 216, 217, 218, 2111 and 212, a feedback resistor 219 and a differential amplifier 2110. The input resistors 217 and 2112 are connected to circuits which are responsive to other parameters excepting that of the engine speed circuit, such as, the intake pressure, engine cooling water temperature, etc. In the description of this embodiment, these responsive circuits will be omitted excepting the engine speed circuit. The discharge control part 220 comprises dividing resistors 221 and 222 and generates a constant voltage. At low rotational speed of the engine, the output voltage of the differential amplifier 2110 is low and the charging current of the integrator circuit 410 increases thereby increasing the voltage on the capacitor to a high potential. In this case, since the discharge current is constant, the ignition timing is retarded. On the contrary, at high engine rotational speed, the output voltage of the differential amplifier 2110 increases and the voltage on the capacitor decreases to a low potential, thereby advancing the ignition timing.

With the construction described above, the operation of the system of this invention will now be described with reference to the signal waveforms shown in FIG. 5. The crankshaft angular position detector means 100 generates rectangular pulses in synchronism with the rotation of the engine crankshaft which is not shown, namely, it generates a "1" level during the time between the angular positions $M_1$ and $M_2$ and a "0" level between $M_2$ and $M_1$ as shown in (a) of FIG. 5 and it generates two cycles or two pulses of its output per every revolution. When the output of the crankshaft angular position detector means 100 goes to the "1" level, the analog switch 11 of the integrator circuit 410 is turned on and at this time the output of the first comparator circuit 430 goes to the "1" level as shown in (c) of FIG. 5 thus turning on the analog switches 12 and 19, while on the other hand the outputs of the AND gates 53 and 54 go to the "0" level so that the analog switches 15 and 17 are turned off and the integrator circuit 410 is connected to the input of the charge control part 210 of the engine condition detector means 200 thus charging the capacitor 16 through the charge resistors 18 and 14. The output of the integrator circuit 410 is compared with the preset voltage $Vref_1$ of the first comparator circuit 430 and the preset voltage $Vref_2$ of the second comparator circuit 440, respectively. When the charging condition is established, the output of the integrating circuit 410 starts increasing in a positive direction as shown in (b) of FIG. 5 and the output of the second comparator circuit 440 shortly goes to the "1" level as shown in (d) of FIG. 5.

Figure 5:
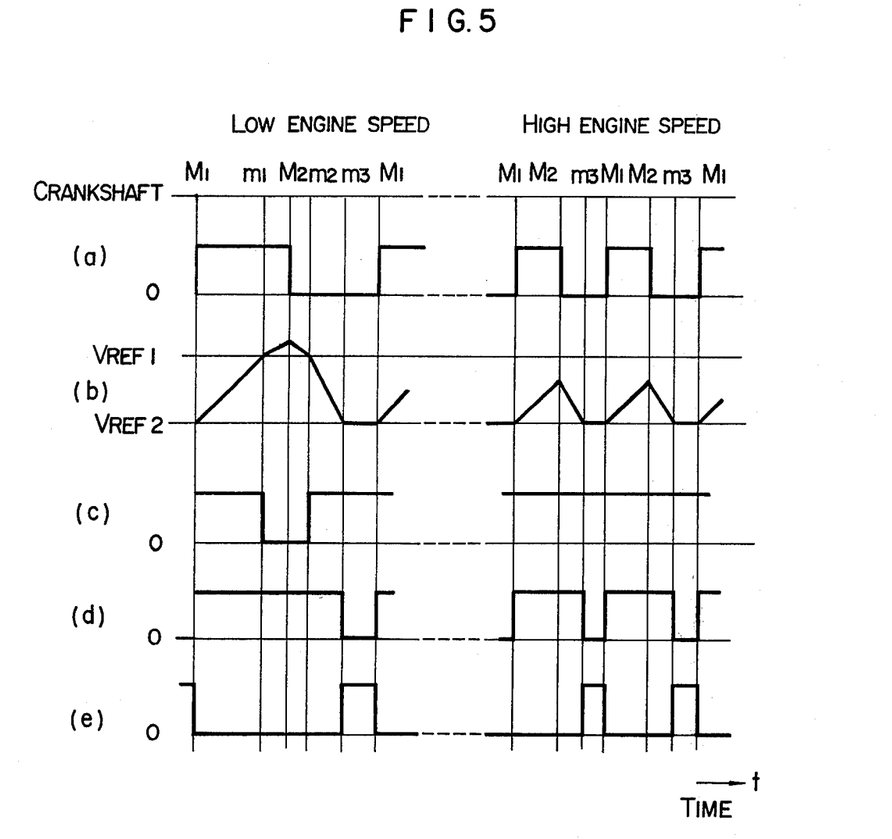
FIG. 5 is a signal waveform diagram useful for explaining the operation of the system of this invention shown in FIG. 4.

When the output of the crankshaft angular position detector means 100 goes from the "1" to "0" level at the point $M_2$ of FIG. 5 as shown in (a) of FIG. 5, the analog switch 11 is turned off and at the same time a "1" level signal is applied to the AND gate 54 through the NOT circuit 51 generating a "1" level signal from the AND gate 54. Consequently, the analog switch 17 is turned on and the capacitor 16 is discharged by the discharge control part 220 through the discharge resistors 18 and 20 thus causing the output of the integrator circuit 410 to decrease toward the negative level. When the voltage on the capacitor 16 eventually becomes lower than the preset voltage $Vref_2$, the output of the second comparator circuit 440 goes to the "0" level at a point $m_3$ of FIG. 5 as shown in (d) of FIG. 5 so that the analog switch 17 is turned off and the analog switch 15 for resetting the capacitor 16 is turned on thus shortcircuiting the terminals of the capacitor 16 and thereby maintaining the output of the integrator circuit 410 at the reference voltage $Vref_2$.

Then, when the output of the crankshaft angular position detector means 100 goes to the "1" level again at the point $M_1$ of FIG. 5 as shown in (a) of FIG. 5, in the same manner as mentioned previously, the analog switch 12 is turned off and the analog switch 11 is turned on causing the capacitor 16 to start charging. Thus, the above-mentioned operation is repeated. At low engine rotational speeds, when the capacitor 16 is charged rapidly and thus the output of the integrator circuit 410 becomes higher than the preset voltage $Vref_1$ of the first comparator circuit 430 before the output of the crankshaft angular position detector means 100 goes to the "0" level, the output of the first comparator circuit 430 changes to the "0" level and the analog switches 12 and 19 are turned off. Consequently, only the charge resistor 13 is used as the charge resistor decreasing the charging current and thus slowing the building up of the voltage on the capacitor 16. When the output of the crankshaft angular position detector means 100 eventually goes to the "0" level, the analog switch 11 is turned off and the analog switch 17 is turned on causing the capacitor 16 to start discharging. At this time, the output of the first comparator circuit 430 is still at the "0" level so that the analog switch 19 is off and only the discharge resistor 18 is used as the discharge resistor thus causing the capacitor 16 to start discharging slowly. When the output of the integrator circuit 410 becomes lower than the preset voltage $Vref_1$ of the first comparator circuit 430, the output of the first comparator circuit 430 changes to the "1" level and the analog switches 12 and 19 are turned on. Thus, the discharge resistor 20 is added and the capacitor 16 is discharged and decayed rapidly. Where the engine operating conditions are constant and the output of the engine condition detector means 200 is constant, there is proportionality between the triangles formed during the time $M_1$ to $m_1$ and $m_2$ to $m_3$, respectively, and between those formed during the time $m_1$ to $M_2$ and $M_2$ to $m_3$, respectively, in FIG. 5 and thus the angular position at which point the discharge terminates is constant irrespective of the rotational speed of the engine.

Now, with the output voltage of the charge control part 210 maintained constant, if the discharge potential of the discharge control part 220 is decreased, the angular position of the discharge termination point $m_3$ is retarded, whereas if the discharge potential is increased the same angular position is advanced. On the contrary, with the output voltage of the discharge control part 220 maintained constant, the angular position of the point $m_3$ may be similarly advanced or retarded by varying the charging potential of the charge control part 210. Consequently, by using the discharge termination point $m_3$ as the desired ignition timing and controlling the charging and discharging operation by the engine condition detector means 200, it is possible to obtain any desired ignition advance characteristic. As a result, the discharge termination point $m_3$ of the integrator circuit 410 is the point at which the output of the second comparator circuit 440 changes from the "1" to "0" level and thus this output signal is applied to the ignition circuit 300 to ignite the engine.

While, in the embodiment described above, the integrator circuit comprises a Miller integrator circuit, the required integrator circuit may also be comprised of any other integrator circuit such as an RC integrator circuit, boostrap or the like. Further, the charging and discharging times of the capacitor 16 are adjusted by the charge and discharge current reducing circuit comprising the charge and discharge resistors 14 and 20 and the analog switches 12 and 19, the similar results may be obtained by providing in the engine condition detector means 200 a charge and discharge current reducing circuit comprising analog switches, etc., and designed to reduce the output voltage of the engine condition detector means 200.

Figure 6:
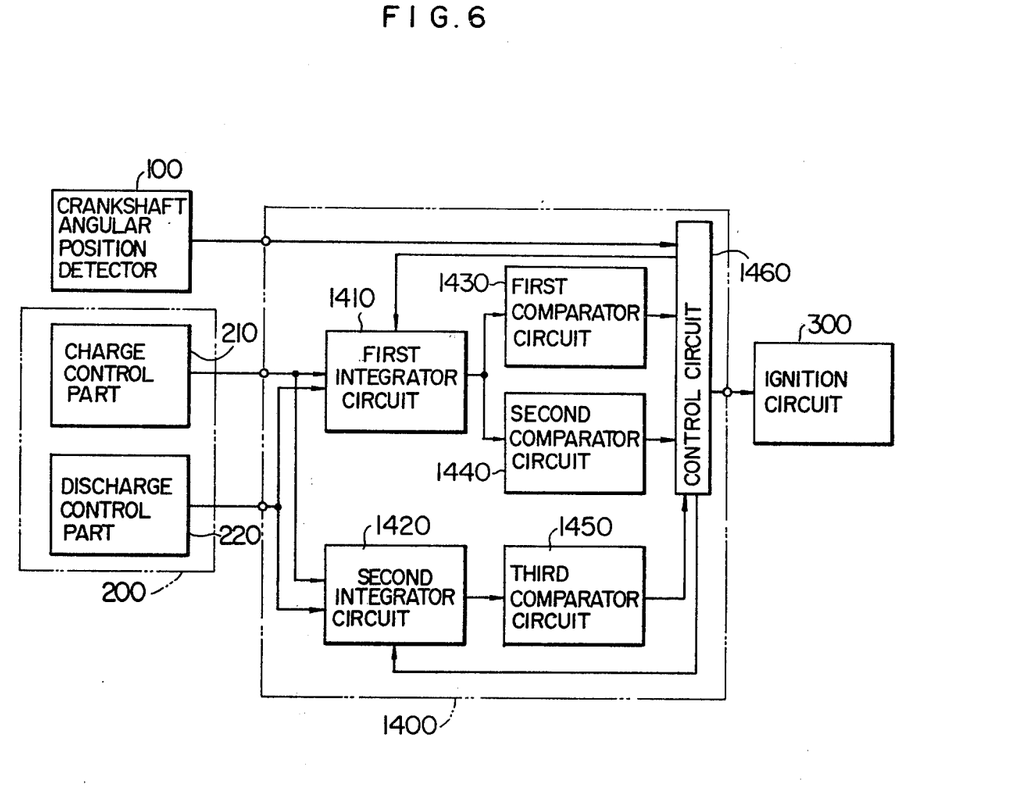
FIG. 6 is a block diagram showing a second embodiment of the system of this invention.

Next, a second embodiment of the invention will be described. In the second embodiment shown in FIG. 6, numeral 1400 designates an ignition timing computing circuit for determining the timing of ignition by a capacitor charge and discharge system, which comprises a first integrator circuit 1410 including a first capacitor, a second integrator circuit 1420 including a second capacitor, a first comparator circuit 1430, a second comparator circuit 1440, a third comparator circuit 1450 and a control circuit 1460 for controlling the first and second integrator circuits 1410 and 1420. The first, second and third comparator circuits 1430, 1440 and 1450 and the control circuit 1460 constitute an ignition signal generating circuit. In this second embodiment, the remaining crankshaft angular position detector means 100, engine condition detection means 200 and ignition circuit 300 are identical with those used in the first embodiment.

Figure 7:
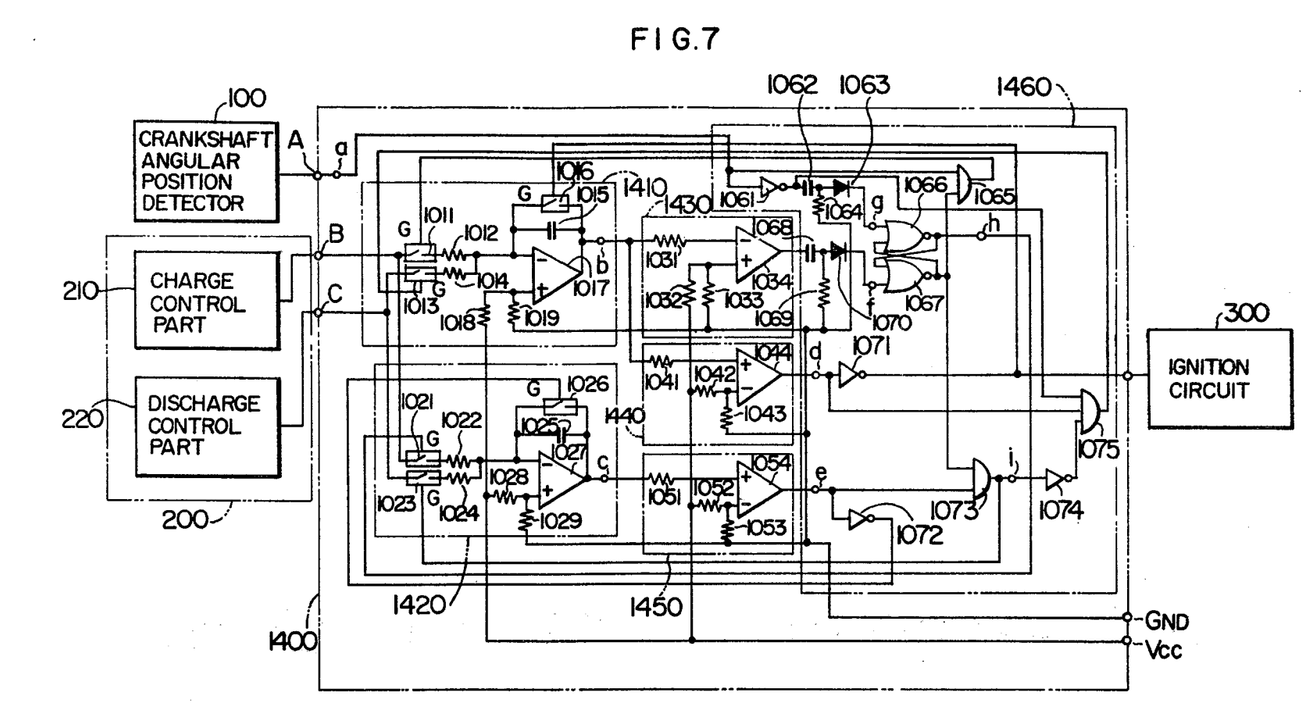
FIG. 7 is a wiring diagram showing detailed circuitry of the system of this invention shown in FIG. 6.

When the construction described above, detailed circuitry of the system of this invention will now be described with reference to FIG. 7. The first integrator circuit 1410 includes an analog switch 1011 for switching on and off the charging current, an analog switch 1013 for switching on and off the discharge current, a charge resistor 1012, a discharge resistor 1014, a first capacitor 1015, an analog switch 1016 for resetting the stored charge in the first capacitor 1015, a differential amplifier 1017 and bias resistors 1018 and 1019, and each of the analog switches 1011, 1013 and 1016 which may be advantageously composed of a field-effect transistor is turned on in response to the application of a "1" level signal to its gate G, while they are turned off in response to the application of a "0" level signal to the same gate G. The analog switches 1011 and 1013, the charge resistor 1012, the discharge resistor 1014 and the engine condition detector means 200 constitute a first charge and discharge current control circuit. The second integrator circuit 1420 comprises an analog switch 1021 for switching on and off the charging current, an analog switch 1023 for switching on and off the discharge current, a charge resistor 1022, a discharge resistor 1024, a second capacitor 1025, an analog switch 1026 for resetting the stored charge in the second capacitor 1025, a differential amplifier 1027 and bias resistors 1028 and 1029, and the analog switches 1021, 1023 and 1026 are of the same type as the analog switches 1011, 1013 and 1016. The analog switches 1021 and 1023, the charge resistor 1022, the discharge resistor 1024 and the engine condition detector means 200 constitute a second charge and discharge current control circuit. The first comparator circuit 1430 comprises an input resistor 1031, bias resistors 1032 and 1033 for setting a preset voltage and a comparator 1034, whereby a "1" level signal is generated at its output when its input voltage is higher than the preset voltage. The second comparator circuit 1440 comprises an input resistor 1041, bias resistors 1042 and 1043 for setting a preset voltage and a comparator 1044, and the preset voltage determined by the bias resistors 1042 and 1043 is the same with the preset voltage $Vref_2$ of the first integrator circuit 1410, whereby a "1" signal is generated at its output when its input voltage is higher than the preset voltage. The third comparator circuit 1450 comprises an input resistor 1051, bias resistors 1052 and 1053 for setting a preset voltage and a comparator 1054, and the preset voltage determined by the bias resistors 1052 and 1053 is the same with the preset voltage $Vref_3$ of the second integrator circuit 1420, whereby a "1" level signal is generated at its output when its input voltage is higher than the preset voltage $Vref_3$. The control circuit 1460 comprises a capacitor 1062, a resistor 1064 and a diode 1063 and a capacitor 1068, a resistor 1069 and a diode 1070 each constituting a differentiation circuit, NOR gates 1066 and 1067 constituting an R-S flip-flop circuit, NOT circuits 1061, 1071, 1072 and 1074 and AND gates 1065, 1073 and 1075. Of course, the output voltage of the charge control part 210 in the engine condition detector means 200 is selected lower than the preset voltages $Vref_2$ and $Vref_3$ and the output voltage of the discharge control part 220 is selected higher than the preset voltages $Vref_2$ and $Vref_3$. Exemplary detailed circuits of the crankshaft angular position detector means 100 and the engine condition detector means 200 will not be described here since they are similar to those shown and described in connection with FIG. 3.

Figure 8:
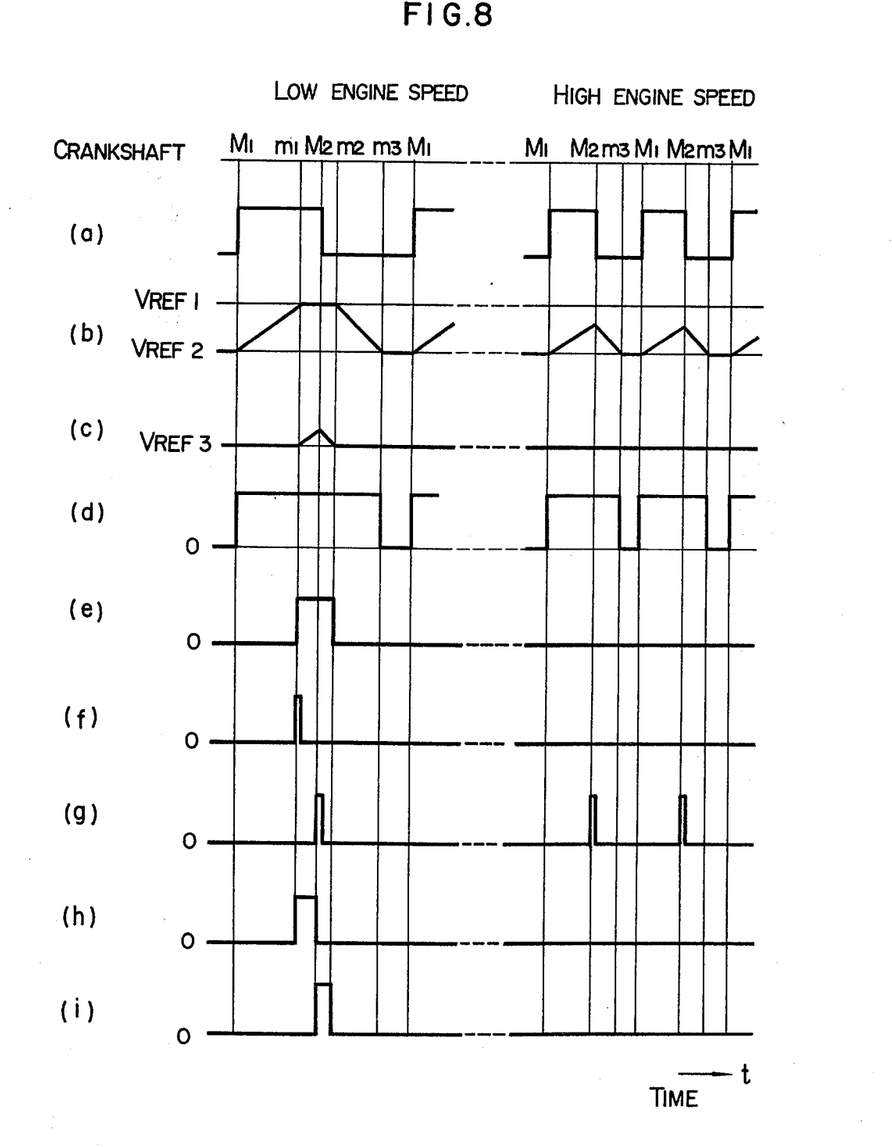
FIG. 8 is a signal waveform diagram useful for explaining the operation of the system of this invention shown in FIG. 7.

With the construction described above, the operation of the system according to the second embodiment of this invention will now be described with reference to the signal waveforms shown in FIG. 8. The crankshaft angular position detector means 100 generates rectangular pulses in synchronism with the rotation of the engine crankshaft which is not shown, namely, it generates a "1" level during the time $M_1$ to $M_2$ and a "0" level during the time $M_2$ to $M_1$ shown in (a) of FIG. 8 and it generates two cycles or two pulses of its output per revolution. When the output of the crankshaft angular position detector means 100 goes to the "1" level, all of the inputs of the AND gate 1065 go to the "1" level causing the analog switch 1011 of the first integrator circuit 1410 to be turned on and a "0" level signal is applied to one input of the AND gate 1075 through the inverter 1061 turning off the analog switch 1013. At this time, the output of the second comparator circuit 1440 is at the "1" level as shown in (d) of FIG. 8, with the result that the analog switch 1016 is turned off through the inverter 1071 and the first integrator circuit 1410 is connected to the input of the charge control part 210 of the engine condition detector means 200 thus charging the capacitor 1015 through the charge resistor 1012 as shown in (b) of FIG. 8. The output of the first integrator circuit 1410 is compared with the preset voltage $Vref_1$ of the first comparator circuit 1430 and the preset voltage $Vref_2$ of the second comparator circuit 1440, respectively. In this embodiment, the bias potential of the first integrator circuit 1410 is preset to the same potential as the preset voltage $Vref_2$. Terminals $V_{cc}$ and GND shown in FIG. 7 are connected to the terminals of the power source. Consequently, when the first capacitor 1015 starts charging, the output of the second comparator circuit 1440 goes to the "1" level. When the output of the first integrator circuit 1410 becomes higher than the preset voltage $Vref_1$, the output of the first comparator circuit 1430 goes to the "1" level so that the positive differentiated pulse shown in (f) of FIG. 8 is generated at the differentiation circuit output f of the control circuit 1460 thus triggering the R-S flip-flop and thereby causing its output h to go to the "1" level as shown in (h) of FIG. 8. When this occurs, the analog switch 1011 is turned off and the output of the first integrator circuit 1410 is held at the preset voltage $Vref_1$ as shown in (b) of FIG. 8. At this time, the analog switch 1021 of the second integrator circuit 1420 is turned on and the capacitor 1025 starts to charge through the charge resistor 1022 as shown in (c) of FIG. 8. The output of the second integrator circuit 1420 is compared with the preset voltage $Vref_3$ of the third comparator circuit 1450. Similarly as mentioned above, the bias potential of the third comparator circuit 1450 is preset to the same potential as the preset voltage $Vref_3$. As a result, at the same time that the second capacitor 1025 starts charging, the output e of the third comparator circuit 1450 goes to the "1" level as shown in (e) of FIG. 8. Then when the output of the crankshaft angular position detector means 100 goes to the "0" level, a positive differentiated pulse is generated at the differentiation circuit output g as shown in (g) of FIG. 8 so that the output of the R-S flip-flop circuit changes its state as shown in (h) of FIG. 8 turning off the analog switch 1021 of the second integrator circuit 1420 and the output i of the AND gate 1073 goes to the "1" level as shown in (i) of FIG. 8 turning on the analog switch 1023. Consequently, the second integrator circuit 1420 is connected to the discharge control part 220 of the engine condition detector means 200 and the second capacitor 1025 is caused to start discharging through the discharge resistor 1024. When the charge stored in the second capacitor 1025 gradually decreases and eventually becomes lower than the preset voltage $Vref_3$, the output of the third comparator circuit 1450 goes to the "0" level so that the analog switch 1023 is turned off and the analog switch 1026 is turned on. Consequently, the terminals of the second capacitor 1025 are short-circuited and the output potential of the third comparator circuit 1450 is held at the preset voltage $Vref_3$. At the same time, the analog switch 1013 of the first integrator circuit 1410 is turned on so that the charge which has been stored and held on the first capacitor 1015 is caused to start discharging through the discharge resistor 1014 and at the same time that the capacitor voltage becomes lower than the preset voltage $Vref_2$ the output of the second comparator circuit 1440 changes to the "0" level. Consequently, the analog switch 1013 is turned off and the analog switch 1016 is turned on thus holding the output of the first integrator circuit 1410 at the preset voltage $Vref_2$. When next the output of the crankshaft angular position detector means 100 goes to the "1" level, the above-mentioned operation is repeated.

Next, when the engine comes into high speed operation, the output of the crankshaft angular position detector means 100 goes to the "0" level before the output of the first integrator circuit 1410 reaches the preset voltage $Vref_1$, so that the analog switch 1013 of the first integrator circuit 1410 is turned on without the operation of the second integrator circuit 1420 and the capacitor discharge is started. In this case, where the operating conditions of the engine are constant and the output of the engine condition detector means 200 is constant, the charge and discharge currents of the first and second capacitors 1015 and 1025 are constant and the angular position at which the discharge terminates is constant independently of the rotational speed of the engine. The same angular position is also constant at higher speeds where the second capacitor 1025 is not used. In this case, if the charge and discharge currents of the second integrator circuit 1420 are reduced at the same rate as compared with those of the first integrator circuit 1410, the charging and discharging times of the second capacitor 1025 are made longer and thus it is possible to prevent saturation of the second capacitor 1025 even at very low engine speeds. In this case, it is only necessary to increase at the same rate the resistance value of the charge and discharge resistors 1022 and 1024 of the second integrator circuit 1420 with respect to the resistance value of the charge and discharge resistors 1012 and 1014 of the first integrator circuit 1410. In this way, at low engine speeds the second capacitor 1025 is used thus making the charging and discharging times longer and thereby stabilizing the ignition timing at low engine speeds, while at high engine speeds where the second capacitor 1025 is not used the ignition timing is stabilized by the first integrator circuit 1410 including the first capacitor 1015 whose charging and discharging times are short and which are excellent in rise and fall.

Now, with the charge control part 210 held constant, if the discharge potential of the discharge control part 220 is reduced, the angular position of the discharge termination point $m_3$ is retarded, whereas if the discharge potential is increased the same angular position is advanced. On the contrary, by holding the discharge control part 220 constant, it is possible to similarly advance or retard the angular position by varying the charging potential of the charge control part 210. Thus, by using the discharge termination point $m_3$ as the ignition timing and accomplishing the charge and discharge control by the engine condition detector means 200, it is possible to obtain any desired ignition advance characteristic. Thus, since the discharge termination point $m_3$ is the point at which the output of the second comparator circuit 1440 changes from the "1" to "0" level, this output signal is coupled to the ignition circuit 300 to ignite the engine.

While, in the embodiment described above, each of the integrator circuits is composed of a Miller integrator circuit, the similar circuits may be obtained by using any other type of integrator circuits such as the ordinary RC integrator circuits or bootstraps. Further, while the charging and discharging times of the first and second integrator circuits 1410 and 1420 are adjusted by means of the charge and discharge resistors 1012, 1014, 1022 and 1024 and the analog switches 1011, 1013, 1021 and 1023, the similar results may be obtained by directly adjusting the output voltage of the engine condition detector means 200 internally.

Still further, while, in the above-described embodiment, when the voltage on the capacitor 1015 of the first integrator circuit 1410 becomes higher than a predetermined value, this voltage on the capacitor 1015 is continuously maintained, since this held voltage is the preset voltage $Vref_1$ itself, instead of holding the voltage of the capacitor 1015, the preset voltage $Vref_1$ may be utilized to instantaneously charge a separate integrator circuit or alternately the charge stored in the capacitor 1015 of the first integrator circuit 1410 may be reset when the voltage on the capacitor 1015 exceeds a predetermined value thus causing the first integrator circuit to also serve as the second integrator circuit.

Still further, while, in the above-described embodiment, the two capacitors 1015 and 1025 are used, it is possible to use three or more capacitors in the system of this invention to obtain the similar results.

We claim:

1. An electronic ignition timing adjusting system for an internal combustion engine which has an ignition system wherein the timing of ignition by said ignition system is electronically adjusted, said adjusting system comprising:

crankshaft angular position detector means for detecting first and second different rotational angular positions of a crankshaft of said engine to generate corresponding first and second detection signals;

charge storage means including at least one capacitor;

a charge and a discharge control circuit connected to said charge storage means for providing a charging current and discharge current to said charge storage means;

switching means connected to said crankshaft angular position detector means, said charge storage means and said charge and discharge control circuit for supplying a charging current from said charge and discharge control circuit to said charge storage means in response to said first detection signal and for supplying a discharge current from said charge storage means to said charge and discharge control circuit in response to said second detection signal;

means connected to said charge storage means for reducing the charge and discharge currents of said charge storage means when the magnitude of the charge on said charge storage means exceeds a predetermined value; and ignition signal generating means connected to said charge storage means for detecting the completion of the discharging of said charge storage means in accordance with said discharge current to generate an ignition signal.

2. An electronic ignition timing adjusting system for an internal combustion engine which has an ignition system wherein the timing of ignition by said ignition system is electronically adjusted, said adjusting system comprising:

crankshaft angular position detector means for detecting a plurality of different rotational angular positions of a crankshaft of said engine to generate a plurality of detection signals each thereof representing the corresponding rotational angle;

means for storing an electrical current charge;

a charge and discharge control circuit for generating a charging current and discharge current to control the amount of charge stored in said storage means;

switching means connected between said charge and discharge control circuit and said an electrical current storage means and to said crankshaft angular position detector means and responsive to said detection signals from said crankshaft angular position detector means for switching on and off and controlling the supply of a charging current and discharge current between said charge and discharge control circuit and said an electrical current storage means;

comparator means connected to said an electrical current storage means and said switching means for controlling said switching means when the amount of the an electrical charge on said storage means reaches a preset predetermined amount and changing the connections between said storage means and said charge and discharge control circuit to vary the amount of the charge on said an electrical current storage means; and ignition signal geneating means connected to said storage means for detecting the completion of the discharging of said storage means in accordance with said discharge current to generate an ignition signal, whereby the charging and discharging of said storage means are controlled in accordance with the amount of the charge thereon.

3. An ignition timing adjusting system according to claim 2, wherein said charge and discharge control circuit comprises a charge control part for generating a constant charging current, and a discharge control part for generating a discharge current varying in response to the operating conditions of said engine.

4. An electronic ignition timing adjusting system for an internal combustion engine which has an ignition system wherein the timing of ignition by said ignition system is electronically adjusted, said adjusting system comprising:

crankshaft angular position detector means for detecting first and second different rotational angular positions of a crankshaft of said engine to generate the corresponding first and second detection signals;

a capacitor;

a charge and discharge control circuit connected to said capacitor for charging and discharging said capacitor with a given charging current and discharge current;

a charge detector circuit connected to said capacitor for detecting whether the amount of the charge on said capacitor has reached a predetermined amount;

an ignition signal generating circuit connected to said capacitor and said crankshaft angular position detector means for charging said capacitor through said charge and discharge control circuit in response to the generation of said first detection signal from said crankshaft angular position detector means and discharging said capacitor through said charge and discharge control circuit in response to the generation of said second detection signal from said crankshaft angular position detector means to select the point of the completion of the discharging of said capacitor as the desired ignition timing to generate an ignition signal; and a charging and discharge current reducing circuit connected to said charge detector circuit and said charge and discharge control circuit whereby when said charge detector circuit detects that the amount of the charge on said capacitor has exceeded said predetermined amount, said charging and discharge currents are reduced at a predetermined rate as compared with those supplied when said charge is not greater than said predetermined amount.

5. An electronic ignition timing adjusting system for an internal combustion engine which has an ignition system wherein the timing of ignition by said ignition system is electronically adjusted, said adjusting system comprising:

crankshaft angular position detector means for detecting first and second different rotational angular positions of a crankshaft of said engine to generate the corresponding first and second detection signals;

a first capacitor;

a first charging and discharge current control circuit connected to said first capacitor for charging and discharging said first capacitor with a given charging current and discharge current;

a second capacitor;

a second charging and discharge current control circuit connected to said second capacitor for charging and discharging said second capacitor with a given charging current and discharge current; and an ignition signal generating circuit connected to said first and second capacitors, said crankshaft angular position detector means and said first and second capacitor charging and discharge current control circuits for charging said first capacitor through said first charging and discharge current control circuit in response to the generation of said first detection signal from said crankshaft angular position detector means and terminating the charging of said first capacitor when the charge thereon reaches a predetermined amount to charge said second capacitor through said second charging and discharge current control circuit and for discharging said second capacitor in response to the generation of said second detection signal from said crankshaft angular position detector means, whereby after the completion of the discharging of said second capacitor said first capacitor is discharged through said first capacitor charging and discharge current control circuit to select the point of the completion of the discharging of said first capacitor as the desired ignition timing to generate an ignition signal, whereas when said second detection signal is generated from said crankshaft angular position detector means before the amount of the charge on said first capacitor has reached said predetermined value said first capacitor is discharged at the point of the generation of said second detection signal to select the point of the completion of the discharging of said first capacitor as the desired ignition timing to generate an ignition signal.

6. An ignition timing adjusting system according to claim 5, wherein the charging and discharge currents of said second capacitor through said second charging and discharge current control circuit are respectively reduced at the same rate as compared with those of said first capacitor through said first charging and discharge current control circuit.

7. An electronic ignition timing adjusting system for an internal combustion engine having an ignition system wherein the timing of ignition by said ignition system is electronically adjusted to said adjusting system comprising:

crankshaft angular position detector means for detecting a plurality of different rotational angular positions of a crankshaft of said engine to generate a plurality of detection signals each thereof representing the corresponding rotational angle;

means for storing charge including a capacitor;

a charge and discharge control circuit for generating a charging current and discharging current to control the amount of charge stored in said storage means;

switching means, connected between said charge and discharge control circuit and said storage means and responsive to said detection signals from said crankshaft angular position detector means, for switching on and off and controlling the supply of a charging current and discharging current between said charge and discharge control circuit and said storage means;

comparator means, connected to said storage means and said switching means, for controlling said switching means, when the amount of the charge on said storage means reaches a preset predetermined amount and changing the connections between said storage means and said charge and discharge control circuit to vary the amount of the charge on said storage means such that said charging and discharging currents are made smaller than those supplied when said storage charge is less than said predetermined amount; and ignition signal generating means connected to said storage means for detecting the completion of the discharging of said storage means in accordance with said discharge current to generate an ignition signal, whereby the charging and discharging of said storage means are controlled in accordance with the amount of the charge thereon.

8. An electronic ignition timing adjusting system for an internal combustion engine which has an ignition system wherein the timing of ignition by said ignition system is electronically adjusted, said adjusting system comprising:

crankshaft angular position detector means for detecting a plurality of different rotational angular positions of a crankshaft of said engine to generate a plurality of detection signals each thereof representing the corresponding rotational angle;

means for storing charge;

a charge and discharge control circuit for generating a charging current and discharging current to control the amount of charge stored in said storage means;

switching means connected between said charge and discharge control circuit and said storage means to said crankshaft angular position detector means and responsive to said detection signals from said crankshaft angular position detector means for switching on and off and controlling the supply of a charging current and discharging current between said charge and discharge control circuit and said storage means;

comparator means connected to said storage means and said switching means for controlling said switching means when the amount of the charge on said storage means reaches a preset predetermined amount and changing the connections between said storage means and said charge and discharge control circuit to vary the amount of the charge on said storage means; and ignition signal generating means connected to said storage means for detecting the completion of the discharging of said storage means in accordance with said discharging current to generate an ignition signal, whereby the charging and discharging of said storage means are controlled in accordance with the amount of the charge thereon;

said storage means including first and second capacitors, said first capacitor connected to said comparator means and said ignition signal generating means;

said switching means connecting said charge and discharge control circuit to said second capacitor when the amount of the charge on said first capacitor is greater than said predetermined value, said second capacitor being supplied with the same charging and discharging currents as said first capacitor.

9. An electronic ignition timing adjusting system for an internal combustion engine which has an ignition system wherein the timing of ignition by said ignition system is electronically adjusted, said adjusting system comprising:

crankshaft angular position detector means for detecting a plurality of different rotational angular positions of a crankshaft of said engine to generate a plurality of detection signals each thereof representing the corresponding rotational angle;

means for storing charge;

a charge and discharge control circuit for generating a charging current and discharging current to control the amount of charge stored in said storage means, said charge and discharge control circuit comprising a charge control part for generating a charging current varying in response to the operating conditions of said engine, and a discharge control part for genrating a constant discharge current;

switching means connected between said charge and discharge control circuit and said storage means and to said crankshaft angular position detector means and responsive to said detection signals from said crankshaft angular position detector means for switching on and off and controlling the supply of a charging current and discharging current between said charge and discharge control circuit and said storage means;

comparator means connected to said storage means and said switching means for controlling said switching means when the amount of the charge on said storage means reaches a preset predetermined amount and changing the connections between said storage means and said charge and discharge control circuit to vary the amount of the charge on said storage means; and ignition signal generating means connected to said storage means for detecting the completion of the discharging of said storage means in accordance with said discharging current to generate an ignition signal, whereby the charging and discharging of said storage means are controlled in accordance with the amount of the charge thereon.

* * * * *